A. SUNDH.
FLEXIBLE TUBING.
APPLICATION FILED OCT. 23, 1913.
1,179,576. Patented Apr. 18, 1916.
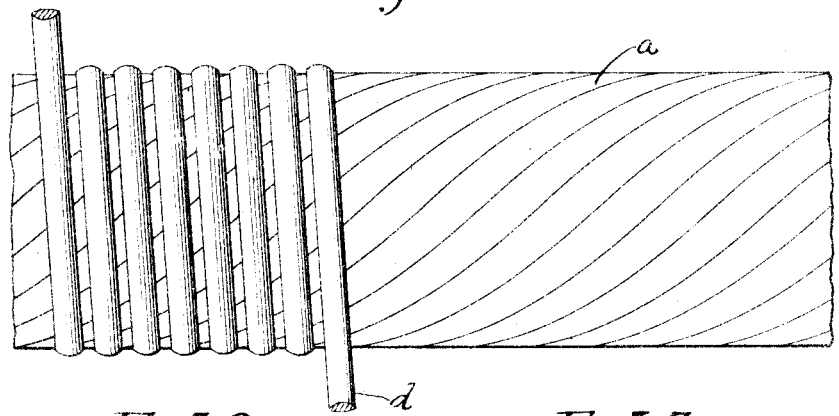
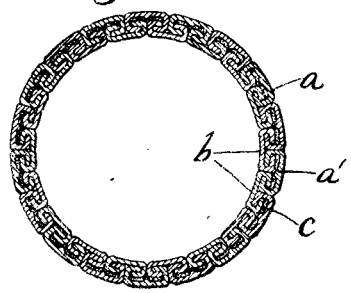
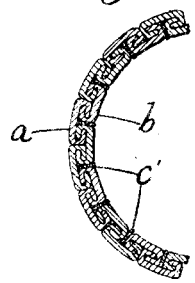
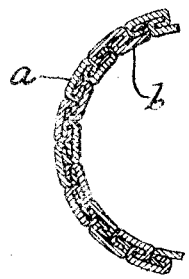
WITNESSES:
Arthur Trezise Jr.
James L. Bethell
August Sundh
INVENTOR
BY
L. H. Campbell
ATTORNEY

UNITED STATES PATENT OFFICE.

AUGUST SUNDH, OF HASTINGS-UPON-HUDSON, NEW YORK.

FLEXIBLE TUBING.

1,179,576.  Specification of Letters Patent.  Patented Apr. 18, 1916.

Application filed October 23, 1913. Serial No. 796,786.

*To all whom it may concern:*

Be it known that I, AUGUST SUNDH, a citizen of the United States, residing in Hastings-upon-Hudson, in the county of Westchester and State of New York, have invented a new and useful Improvement in Flexible Tubing, of which the following is a specification.

My invention relates to flexible metallic tubing employed for the transmission or conduction of fluids or other substances, such as water, steam, gas, air, or other substances.

It may also be used to inclose electric wires or ropes or cables or other like bodies which need to be supported or protected.

Further my invention is usable for any other purposes to which it may be adapted.

I will proceed to disclose and claim my invention in which—

Figure 1 represents a portion of the tubing with an outside or encircling binding strip thereon; Fig. 2 is a cross sectional view of the tubing, showing one form thereof; Fig. 3 is a cross sectional view of a portion of the hose or piping, showing another modification thereof; Fig. 4 is a cross sectional view similar to those of Figs. 2 and 3, except that the packing is omitted therefrom.

In the transmission of fluids in tubes, or the carrying and supporting of other bodies therein, such for example, as those mentioned above, by way of illustration and not exclusive, it is desirable that the tubing shall be capable of being flexed or bent to adapt the same to fit the location or situation in which the tubing is to be placed; it is also desirable in a flexible tube that when the same is bent it shall remain leak-proof in the case of the transmission of fluids and its interior surface shall be free of irregularities in order that the flow of the fluids shall be unobstructed; the feature of smooth surface is also desirable and highly useful in the case of the support or carrying therein of electric wires and in the case of cables or ropes or other bodies; it is my object to produce a tube which shall have the qualities of being readily, easily and successfully flexed or bent, as well as to be successfully usable for straight line work, and which will confine fluid under pressure so as successfully to withstand the pressure inside and outside as well.

My invention is embodied in the following disclosed forms, among others, in which there are metal strips $a$ $b$ of suitable length and of a cross section similar to that of a double-ended hook, substantially, which strips are made up into a series of coils in a long pitch, with their hooks engaging each other to form the body of the tube, the hooks of one strip $a$ facing toward the interior of the pipe, and the hooks of the adjacent strip $b$ facing the exterior of the tube. The fit of these hooks may be made sufficiently tight to secure leak-proof joints, as shown in Fig. 4; or there may be placed between the hooks and the wall of the strip a packing, $c$, as shown in Fig. 2, or a packing $c'$ between the adjacent strips $b$, as shown in Fig. 3, in all the instances the joints of course will be securely packed to be leak-proof. I wind around the body of the tube a holding or binding strip $d$ in coils of shorter pitch than the pitch of the strips $a$ and $b$, the binding or tying strip $d$ serving to aid in maintaining the tube strong and also serving as a protection to the outside wear or injury of the tube.

I have found by experiment that by arranging metal strips of the shape shown in the drawing in a long pitch, that when the tube is bent a sliding action will take place between the strips, in something the same way as the strips in wire rope, which sliding action will permit the tube to be bent without spreading or separating the strips. Such a structure will of course permit of the transmission of fluids without leakage. This is the important feature of my invention. With the flexible tubes as at present constructed, it has been found necessary to either have an inner continuous tube of rubber, for instance, for the conveyance of the fluid, the metal tube merely serving as an armor to protect the inner tube from injury, or to place packing between the strips of metal, but in the latter case, owing to the manner in which the strips are laid and shaped there is a constant grinding of the packing between the strips, which very soon results in the wearing out of the packing, and of course leakage of the tubing. With my arrangement, however. I have, by making my strips of a peculiar shape and laying them in a very long pitch, obtained a tubing which is flexible, fluid tight and long lived.

It is understood that my flexible tube will be formed of suitable metal having in mind the particular purpose for which the tube shall be used; for example, if used in the transmission of water, one kind of metal, for example, brass, copper, aluminum, etc., is better adapted for the purpose, having in mind the corroding effects of the water on the metal; while in the transmission of steam or gas or air, particularly where the same is highly heated, another kind of metal, for example, steel, might be better adapted for the purpose than some other kind of metal.

I have not mentioned the material of which the packing is composed, since it is obvious to those skilled in the art that the material of the packing like the metal for the strips will be selected from those which are best adapted for the particular use to which the tube is put; in each case, however, it will be understood of course, that the material selected will be such as to permit the tube to subserve its purpose of flexibleness.

On the inside surface of one of the strips, for instance the outside strip $a$, I have placed a ridge $a'$ central of the longitudinal length of the strip, which serves to strengthen the strip and render it more stable without materially increasing the amount or weight of metal in the strip; furthermore in the tube structure the ridge falls opposite the joint between the adjacent inner strips and serves, together with the packing, to insure the complete leak-proofness of the hose, among other things.

While I have disclosed several embodiments of my invention, I desire not to be excluded from the use of any equivalent embodiments within the skill and knowledge of persons conversant with the art.

What I claim is my invention, and desire to have protected by Letters Patent of the United States is:—

1. In a flexible metallic tube, a number of coils of long pitch, each of said coils formed in an oblong double hook-shaped cross section and hooked together to form a fluid-tight tube structure at all times, each coil having a longitudinally placed center ridge to strengthen the same.

2. In a flexible metallic tube, a number of coils of long pitch, the coils having a longitudinally placed center ridge, each of the coils formed in an oblong double hook-shaped cross section and hooked together to form a fluid tight tube structure at all times, and a packing placed within one of the strips forming the coils between the adjoining strips.

3. In a flexible metallic tube, a number of coils of long pitch, each of the coils formed in an oblong double hook shaped cross section and hooked together to form a fluid tight tube structure at all times, the coils having a longitudinally placed ridge substantially opposite the joint between the adjacent inner strips, and a packing placed within one of the strips forming the coils between the adjoining strips.

4. In a flexible metallic tube, a number of coils of long pitch, each of the coils formed in an oblong double hook shaped cross section and hooked together to form a fluid-tight tube structure at all times, the coils having a longitudinally placed center ridge substantially opposite the joint between the adjacent inner strips, and a packing placed within one of the strips forming the coils between the adjoining strips.

5. Flexible metallic tubing comprising a plurality of longitudinal double hook shaped strips coiled in a long pitch and hooked together to form a fluid-tight tubing at all times.

6. The combination of a plurality of longitudinal double hook-shaped metallic strips coiled in a long pitch and hooked together to form a fluid tight flexible tubing at all times.

7. The combination of a plurality of longitudinal double hook-shaped metallic strips coiled in a long pitch and hooked together to form a fluid tight tube structure having uniform sliding motion between all of the strips when the tube is bent to maintain the tubing fluid tight.

8. The combination of a plurality of longitudinal double hook-shaped metallic strips coiled in a long pitch and hooked together to form a fluid tight flexible tube structure, said strips being so constructed that the same will not be opened or contracted when the tube is bent and maintaining the same fluid tight at all times.

9. The combination of a plurality of longitudinal double hook-shaped metallic strips coiled in a long pitch and hooked together to form a fluid tight flexible tube structure, the length of the pitch being proportional to the desired flexibility of the tube whereby the tube may be bent a desired degree without opening or contracting of the strips and maintaining the tube fluid tight.

10. The combination of a plurality of longitudinal double hook-shaped metallic strips coiled in a long pitch and hooked together to form a fluid tight flexible tube structure, a plurality of packing strips coiled in a long pitch and placed between the hook-shaped strips, the pitch of the strips and the packing strips being such as to maintain the tubing fluid tight at all times.

11. The combination of a plurality of longitudinal double hook-shaped metallic strips coiled in a long pitch and hooked together to form a fluid-tight flexible tube structure, a plurality of packing strips coiled in a long pitch and placed between the hook-shaped strips, the pitch of the strips and the packing strip being such as to maintain the tubing fluid tight at all times, and a spiral strip of shorter pitch than the long pitch strips wound outside the tubing to reinforce the same.

In testimony whereof, I have signed my name to this specification in the presence of two subscribing witnesses.

AUGUST SUNDH.

Witnesses:
 JAMES G. BETHELL,
 WALTER C. STRANG.